UNITED STATES PATENT OFFICE.

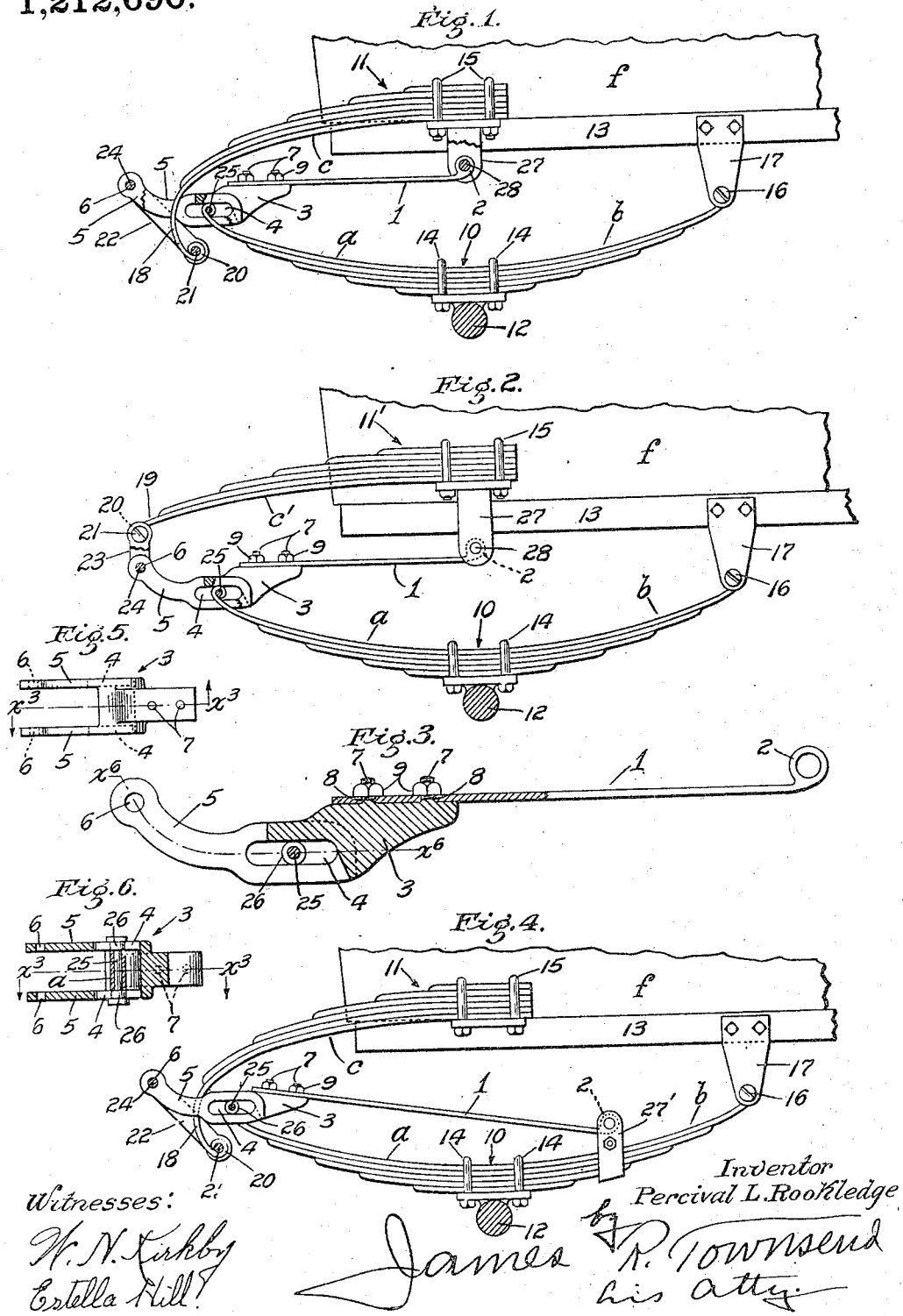

PERCIVAL L. ROOKLEDGE, OF HOLLISTER, CALIFORNIA.

VEHICLE-SPRING.

1,212,690.  Specification of Letters Patent.  Patented Jan. 16, 1917.

Application filed February 9, 1915. Serial No. 7,142.

*To all whom it may concern:*

Be it known that I, PERCIVAL L. ROOKLEDGE, a citizen of the United States, residing at Hollister, in the county of San Benito and State of California, have invented new and useful Improvements in Vehicle-Springs, of which the following is a specification.

This invention relates to improvements in that class of springs exemplified in Letters-Patent of the United States, No. 1,044,692 granted to myself and G. W. Gillespie Nov. 9, 1912, in which is shown a spring for resiliently separating two bodies, comprising a lever spring having relatively rigid and resilient arms, a fulcrum between said arms, a spring on one of said bodies supporting the fulcrum and a spring supporting the other body and connected with the ends of the lever spring; and further exemplified in my co-pending application for Letters-Patent of the United States, filed Dec. 23, 1912, Serial No. 738,395, in which I have shown a spring for resiliently separating two bodies, comprising a lever spring having three connections, one of which is slidable; said lever spring being connected through two of said connections with one of said bodies and through the remaining connection with the opposite body; one of said connections serving as a fulcrum for the lever spring.

An object of this invention is to so apply the principle of the lever spring in combination with other spring means as to secure greater shock-absorbing qualities. I accomplish this by having in the intermediate part of the lever spring a substantially horizontal slot with which the rear end of the lower spring is slidably engaged, and by curving the rearward end of the upper spring downwardly beyond and below the rear end of the lower spring, and by providing a link connection between the end of the lever spring, rearwardly of the slot, and the rearward end of the upper spring. By this construction the fulcrum of the lever spring changes automatically from front to rear in accordance with the changing pressure upon the upper and the lower springs and their consequently changing curvatures, and the linked end of the upper spring automatically acts in conjunction with this changing pressure, so that an equilibrium of leverage is automatically maintained by the lever spring during all the variations of pressure, and the resiliency of the springs is thereby adjusted according to the varying conditions.

The invention includes the novel construction of the spring and parts thereof and also the novel combination with the two bodies to be separated, of the parts by which said bodies are separated.

It is understood that the vehicle spring may be adapted to serve as a shock absorber between any two relatively movable bodies within the judgment and skill of the constructor.

Further objects are cheapness, ease of constructing and assembling; also strength and durability.

Other objects and advantages may appear from the subjoined detail description.

The accompanying drawings illustrate the invention.

Figure 1 is a side elevation of a highly resilient form of the invention as applied to an automobile, portions of which are shown. Fig. 2 is a side elevation of another form embodying features of the invention. Fig. 3 is a view partly in section of the lever spring shown in Figs. 1 and 2, with fulcrum pin and roller in place. The line of section is readable at $x^3$, Figs. 5 and 6. Fig. 4 is a side elevation of a form of the invention analogous to that shown in Fig. 1, the slidable fulcrum connection and the lever arm connection of the lever spring being with the axle spring. Fig. 5 is a view of the upper side of the shank or rigid arm of the lever spring. Fig. 6 is a reduced section taken on curved line $x^6$—$x^6$, Fig. 3, looking upward and showing the slidable fulcrum pin mounted in place with the eye of the lower spring in section.

In each of the views one member of the lever spring is a resilient arm 1 formed of suitable spring material and provided with an eye 2 at one end and constructed at its other end for attachment to a shank 3 which completes said lever spring and may be formed of cast or wrought steel or other suitable material and is provided with a longitudinal slot 4. Said shank is forked, each furcation 5 having an eye 6. Said shank may be provided with studs 7 integral therewith to pass through holes 8 in the resilient arm 1, and said studs may be threaded to receive nuts 9 by which the arm 1 is secured to the shank.

Semi-elliptic spring members 10, 11 are attached respectively to the axle 12 and chassis 13 of the automobile or other vehicle by means of the usual clips 14, 15 respectively. The lower semi-elliptic spring 10 in all the forms shown is a half-elliptic spring secured by suitable means as the bolt 16 to a hanger 17 that is connected at one end with the chassis 13. The upper semi-elliptic spring in all the forms shown is a quarter-elliptic spring, as 11, 11′, and it may have its end extended downward and its free end extended to form the return bend 18 as in Figs. 1 and 4, or it may terminate in the practically straight limb 19 as indicated in Fig. 2, the end of the spring in each instance being provided with a suitable eye 20 to receive the bolt 21 to effect connection through suitable means as the link 22 or 23 and the bolt 24 with the eye 6. The free end of the half-elliptic-spring 10 is correspondingly provided with an eye to receive the bolt 25 to form a connection either with or without an anti-friction roller 26 to support the lever spring.

The lever spring composed of the lever arm 1 and the slotted shank 3 is constructed as shown having the three connections or parts used to connect said lever spring with other parts or elements that go to make up the complete vehicle. Said connections consist of the eyes 2 and 6 and the slot 4 by means of which said lever spring is mounted as shown; being connected through two of said connections with one of the bodies 12, 13 to be resiliently held apart, and through the remaining connection with the opposite body 13 or 12 as the case may be; said lever being fulcrumed at the slidable connection 4.

In Fig. 1 the lever spring is connected through the eye 2 and the hanger 27 with the chassis 13, and is connected through the connection 6, bolt 24, link or shackle 22 and bolt 21 and the quarter-elliptic spring 11 with the same body 13; and said lever spring is slidably connected through the connection slot 4, the bolt 25 and its anti-friction sleeve 26 and one arm of the half-elliptic spring 10 with the axle body 12.

In Fig. 4 the connection between the two bodies is practically the same as that just stated with the exception that the bracket 27′ fastened to the arm b of the half-elliptic spring 10 is substituted for the hanger 27 and the lever arm 1 of the lever spring is connected through said arm b with both the chassis body 13 and axle body 12.

In Figs. 1 and 4 the spring arm c extends around the fulcrum of the spring lever on arm a, and the link 22 extends upward aslant away from said fulcrum and is connected to one end of the lever spring, the other end of which lever spring is connected to one of said spring arms so that the movement of the bases of the spring arms held by clips 14, 15 causes a pull to be exerted by the link upon the curved portion 18 of the spring arm, thus affording superior resilient effects.

In practical operation shocks from below lifting the lower body 12 can only reach the upper body 13 through the medium of the lower spring 10, the lever spring 1, 3 and the upper spring 11 or 11′. Said shock is resisted by the sliding connection 4 and is by it transmitted through the lever spring and connections 6, 24, 22, 21 to the upper spring 11, in Figs. 1 and 4. Said shock, as the body 12 rises, tends to straighten the limb a of the lower spring 10 owing to the resistance of the sliding connection at the fulcrum 4, 25. The lower spring is thus operably lengthened and such lengthening is allowed for by the slot in the bracket, and thence the shock is carried farther upward through the lever arm 1 and the connection 6, 24 with the link 22, to the arm c or c′ as the case may be with the result that the shock is practically absorbed before it reaches the body 13. The link 22 and the sliding fulcrum 4, 25, thus together constitute means whereby an equilibrium of resilience is maintained between the axis 12 and the chassis 13 during varying pressure upon the spring members 10 and 11.

In the former constructions of the lever spring, for instance in my Patent #1,044,692, the lever spring, when subjected to shocks or to the stress of a heavy load, is bent upwardly, and when a maximum curvature of the lever spring has been attained a bumper in the upper spring body was necessary to absorb further shock or stress until under extreme shock or pressure the lever spring would be pressed down upon a lower bumper in the lower spring body. This lever spring with a slidable fulcrum arranged as shown, avoids the use of bumpers for absorbing shocks and for relieving extreme stress upon the lever spring. When a shock or a stress is conveyed to the lower spring arm 10 it has a tendency to straighten this arm, and this straightening effects a rearward movement in the slot 4 of the fulcrum element 25 at the rearward end of the spring arm, thereby shortening the leverage of the lever spring between the fulcrum 25 and the rearward end of said lever spring, or the eye 24, where the leverage is applied through the bolt 24 by the link 22 from the rearward end of the upper spring arm 11. On account of this shortened leverage between the fulcrum 25 and the rearward end of the lever spring, greater force is required to bend the long end of the lever spring between the fulcrum and the eye 2 upwardly. The greater the shock or the stress is upon the lever spring, the farther back the fulcrum 25 is thus pushed in the slot 4, so that the upward curving of the long forward end of the spring lever is minimized. The sliding movement of the fulcrum therefore is an excellent substitute for bumpers in this class of springs. It is further clear that without such sliding movement as in the former constructions where the fulcrum is stationary, the curving tendency of the lever spring when the latter is subjected to stress or shocks could not be regulated except by means of bumpers.

The effect is practically the same with the form shown in Fig. 4 as with that shown in Fig. 1, in each of which the shock is absorbed through the medium of the lever spring and the arms $a$, $c$, the end of the lever spring 1 being connected, in Fig. 4 with the chassis body 13 through the spring arm $b$ and the hanger 17 and also with the body 12 through said arm $b$ and the clip 14.

When weight is added to the car $f$ there will occur in the forms shown in Figs. 1 and 4, a slight separating of the arm $c$ of the top spring 11 from the arm $a$ of the lower spring, due to the action of the lever spring, there being an upward bowing of the long resilient arm of the lever spring and a backward downward action of the links connecting the arm $c$ with the arm 5 of the lever.

A downward thrust of the car will change the direction of its force through the action of the short arm 5 of the lever, the downward action at $c$ being translated into upward action of the arm 1, the thrust being taken up by this double action and the free lengthening and straightening of the arm $a$, owing to the sliding connection and fulcrum support at 4, 25.

The long resilient arm 1 of the lever spring in Figs. 1 and 2 is hinged to the under surface of the upper spring and to the chassis body of the car by means of the bolt 28, the hanger 27 and the clip 15. The rigid construction of this hanger and clip prevents the lever from moving backward or forward, the lengthening or shortening of the lever being allowed by the movement which takes place in the slot connection 4 just as the lower spring is allowed to lengthen or shorten its connection at said slot.

The lower spring 10 is connected to the car by the hanger 17 so as to prevent undesirable relative horizontal or longitudinal movement between the bodies 12 and 13. The bases of the spring members 10, 11 are thus held in relative positions necessary to secure the greatest efficient action.

I claim:

1. A spring for resiliently separating two bodies comprising a lever spring having three connections, one of which is slidable, said lever spring being connected through two of said connections with one of said bodies and through the remaining connection with the opposite body, said lever spring being fulcrumed at the slidable connection.

2. The combination with two spring arms, of a lever spring having three connections, said lever spring being connected through two of said connections with one of said spring arms and through one of said connections with the opposite spring arm, the connection with said opposite spring arm being slidable and intermediate the other two connections, said lever spring being fulcrumed by the slidable connection.

3. The combination with two bodies to be separated, of a half-elliptic spring connected between its ends with one of said bodies and connected at one end with the other of said bodies, a lever spring slidably fulcrumed intermediate its ends to the other end of said half-elliptic spring, a spring arm connected to the other of said bodies, a link connecting the end of said spring arm with one arm of said lever spring, and means connecting the other arm of the lever spring with said other body.

4. The combination with two bodies to be separated, of a half-elliptic spring connected between its ends with one of said bodies and connected at one end with the other of said bodies, a lever spring slidably fulcrumed intermediate its ends to the other end of said half-elliptic spring, a spring arm connected to the other of said bodies, and extending around the sliding fulcrum, a link connecting the end of said spring arm with one arm of said lever spring, and means connecting the other arm of the lever spring with said other body.

5. The lever spring set forth adapted to form part of a spring for yieldingly separating two bodies, which lever spring consists of a slotted shank having a connection at one end, and a resilient arm fixed at one end to the other end of the shank; said resilient arm having a connection at its other end and the slot of the shank being intermediate between said end connections.

6. A slotted bifurcated shank having eyes in the furcations and a resilient arm fixed to the shank and having an eye at its end; said shank and arm forming a lever spring, said slot and eyes forming connections for mounting said lever spring in combination with other elements for the construction of a vehicle spring.

7. The combination with two spring arms, of a lever spring slidably fulcrumed between its ends to one of said arms; the other of said arms extending around the fulcrum, and a link connecting one end of the lever spring with the end of said other arm; and means connecting the other end of the lever spring with one of said spring arms.

8. The combination with two spring arms, of a lever spring slidably fulcrumed between its ends to one of said arms; the other of said arms extending around the fulcrum, and a link extending away from said fulcrum and connecting one end of the lever spring with the end of said other arm; and means connecting the other end of the lever spring with one of said spring arms.

9. The combination with a spring arm, of a spring lever slidingly fulcrumed between its ends to said arm, a spring arm extending around the fulcrum, a link connected to the end of the arm which extends around said fulcrum and extending away from said fulcrum and connected to one end of said lever spring, and means connecting the other end of said lever spring with one of said spring arms.

10. The bifurcated lever spring set forth for use between two spring arms; said lever spring consisting of a shank having eyes at the ends of its forks, a resilient arm fixed to the shank and extending away from such forks and a slot between the forks and resilient arm.

11. In combination with a curved upper spring arm, connected at its forward end with an upper body, and a curved lower spring arm, connected between its ends with a lower body and at its forward end with said upper body; a lever spring between said arms; said lever spring being provided with means at its forward end for connecting it with one of said arms, and being slidably fulcrumed near its rearward end to the rearward end of said lower arm; the rearward end of the upper arm extending around said fulcrum; and a link having its lower end connected with the rearward end of the upper arm; said slidable fulcrum and said link being adapted to work in conjunction for automatically maintaining an equilibrium of resiliency between said bodies during increased or decreased pressure upon said arms.

In testimony whereof, I have hereunto set my hand at Hollister, California, this 28 day of Jan. 1915.

PERCIVAL L. ROOKLEDGE.

In presence of—
C. L. WEAVER,
W. D. HOLT.

Copies of this patent may be obtained for five cents each, by addressing the "Commissioner of Patents, Washington, D. C."